C. W. H. VON ECKERMANN & I. RENNERFELT.
ELECTRIC ARC FURNACE.
APPLICATION FILED JULY 15, 1915.
1,206,057.
Patented Nov. 28, 1916.
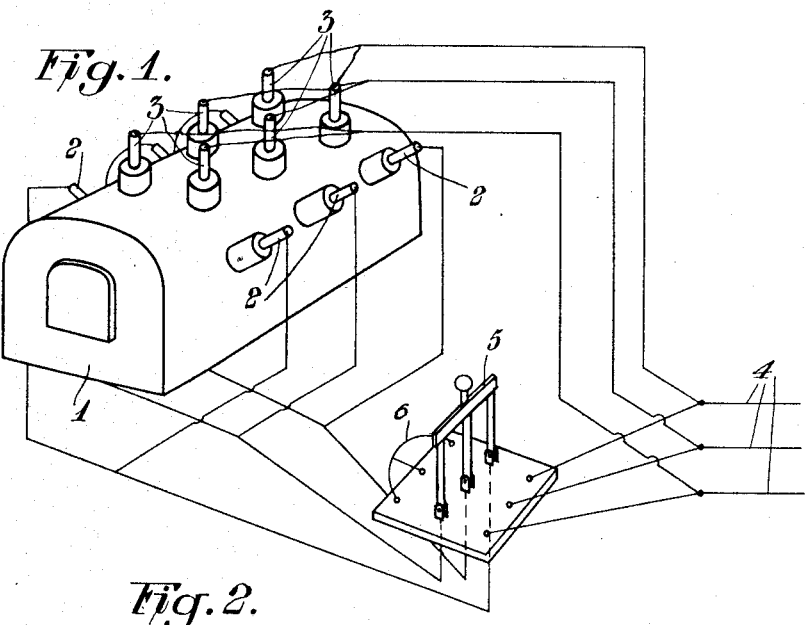
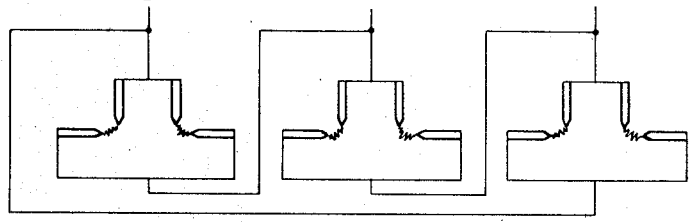
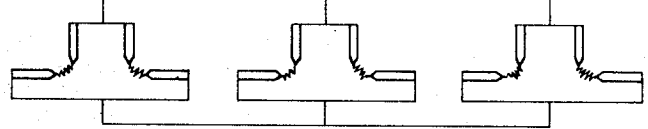
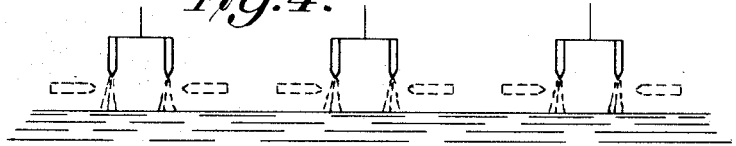

UNITED STATES PATENT OFFICE.

CLAS WALTHER HARRY von ECKERMANN, OF LJUSNE, AND IVAR RENNERFELT, OF DJURSHOLM, SWEDEN.

ELECTRIC-ARC FURNACE.

1,206,057.   Specification of Letters Patent.   Patented Nov. 28, 1916.

Application filed July 15, 1915. Serial No. 40,145.

*To all whom it may concern:*

Be it known that we, CLAS WALTHER HARRY VON ECKERMANN and IVAR RENNERFELT, subjects of the King of Sweden, and residents, respectively, of Ljusne, in the Kingdom of Sweden, and of Djursholm, in the Kingdom of Sweden, have invented a new and useful Improvement in Electric-Arc Furnaces, of which the following is a specification.

Electric arc furnaces are known which are characterized by a horizontally elongated crucible provided with a plurality of systems of electrodes, each system being composed of a number of electrodes located in a plane perpendicular to the longitudinal axis of the furnace. The systems of electrodes may each be composed of opposing horizontal or nearly horizontal electrodes in coöperation with a common vertical electrode, or each horizontal electrode with a separate vertical or top electrode. Electric energy is supplied to the various systems of electrodes from transformers of suitable construction, and we are not limited to any particular number of phases, but may select this in the most suitable manner.

This invention relates to an arrangement in such furnaces by means of which it is possible to use either freely burning arcs, that is, arcs burning between the electrodes, or arcs burning between the electrodes and the charge in the furnace.

Freely burning arcs are of advantage when melting scrap and the like, and also in case the charge is non-conductive when cold. Such arcs are particularly suitable when the chemical reactions in the charge cause a violent boiling and formation of slag, as when puddling pig iron. Arcs contacting with the charge may again be of advantage for deoxidizing and desulfurizing when the charge has become melted and the boiling has ceased. By contacting directly with the bath, the heat of the arcs is concentrated on certain particular points, facilitating a more or less automatic formation of carbid which is favorable for deoxidation. For producing carbid, carbon is thrown on the basic cover of slag, but also the electrodes may assist to some extent by means of parts getting loose from the points of the same. It is evident that the formation of carbid is very much facilitated because there are formed centers of heat at a number of points evenly distributed over the whole surface of the charge. It is also evident that a furnace arranged in this manner is particularly suitable for all the various operations occurring in a furnace in which steel is to be produced directly from pig iron and ore. During the first stage of operation the heat is evenly distributed over the entire surface of the charge, hence the cover of slag becomes thin and capable of reaction. During the latter stage of operation when a very high temperature is required for deoxidation and desulfuration, this is obtained in the simplest manner by developing the heat directly on the surface of the charge.

In the accompanying drawing Figure 1 illustrates, by way of example, the general arrangement of a furnace according to the present invention and provided with three systems of electrodes connected to a three-phase alternating current circuit. Figs. 2, 3, and 4 show diagrams of connection for this furnace.

Referring to Fig. 1, the furnace 1 is provided with three systems of electrodes, each composed of two side electrodes 2 and two top electrodes 3. The electrodes are supplied with current from a three-phase feeder circuit 4, a switch 5 being inserted in the circuit. When the switch is thrown to the right in Fig. 1 each of the systems will be connected in one phase of the circuit, and these phases are $\triangle$-connected as shown in the diagram Fig. 2. Freely burning arcs will thus be formed between the top and the side electrodes. The voltage per arc is the same as that between the line wires, while the current per system of electrodes is equal to the current per line wire divided by $\sqrt{3}$.

If the switch is thrown over to the left in Fig. 1 arcs will still be formed between the top and the side electrodes of the systems. In this case, however, the phases are Y-connected as shown in the diagram Fig. 3, the conductor 6 serving as neutral point. The voltage per arc is equal to the voltage between the line wires divided by $\sqrt{3}$ while the current per system is the same as that of the line wires.

When it is desired to apply the arcs directly to the charge, the switch is moved to the position shown in Fig. 1. The side electrodes are thus disconnected from the circuit, and the bath itself serves as neutral point, as illustrated in the diagram Fig. 4. The voltage and the current per arc are, of course, the same as for the connection Fig. 3. The side electrodes are without current and may be removed from the furnace, if desired.

It is of advantage to use two top electrodes for each system when the furnace is comparatively wide, as in this manner two separate arcs are obtained for each system and the heat is thus better distributed in the furnace. When the furnace is narrow only one top electrode for each system may be used.

We claim:

1. The combination with an electric arc furnace provided with a horizontally elongated crucible, of a plurality of systems of electrodes, each system being composed of a number of electrodes located in a plane perpendicular to the longitudinal axis of the furnace, and means for connecting said electrodes to a source of electric current in such manner as alternately to produce arcs between the electrodes of each system, and between the electrodes and the charge in the furnace.

2. The combination with an electric arc furnace provided with a horizontally elongated crucible, of a plurality of systems of electrodes, each system being composed of a number of electrodes located in a plane perpendicular to the longitudinal axis of the furnace, and means for connecting said electrodes to a three-phase alternating current circuit in such manner as alternately to produce arcs between the electrodes of each system by connecting each system in one phase of the circuit, and between the electrodes and the charge in the furnace by connecting the electrodes in Y-connection with the charge as neutral point.

C. W. H. von ECKERMANN.
IVAR RENNERFELT.

Copies of this patent may be obtained for five cents each, by addressing the "Commissioner of Patents, Washington, D. C."